April 26, 1955

M. E. TINKHAM 2,707,006

TEMPLE MOUNTING MEANS

Filed May 15, 1952

INVENTOR.
MERTON E. TINKHAM
BY
Rodney C. Southworth
ATTORNEY

United States Patent Office 2,707,006
Patented Apr. 26, 1955

2,707,006

TEMPLE MOUNTING MEANS

Merton E. Tinkham, Hopedale, Mass., assignor to Draper Corporation, Hopedale, Mass., a corporation of Maine Application May 15, 1952, Serial No. 287,887

4 Claims. (Cl. 139—298)

This invention pertains to improvements in temple mounting means such as are employed on looms for weaving.

It is a general object of the invention to devise improvements in a temple mounting means of the type adapted for a swinging movement and to be supported below the plane of the fabric in the loom and which is further borne in elastic bearings designed to serve not only as a bearing but also as a biasing means for urging the temples in a direction contra to the movement of the fabric as it is produced.

It is a further object of the invention to improve temple mounting means of the type described which employ a shaft running transversely of the loom with bearing means at either end thereof, but which shall also provide a desired amount of independent movement of either temple so that the position or limits of movement of the temples may be individually set or adjusted, and also so that either temple may be moved without affecting the other.

Other objects of the invention will become apparent from the following more detailed description.

In applying the invention to a typical loom, temples attached at the relatively free end of temple supporting arms are adapted to be swung about a center below the plane of the fabric and so positioned that the movement of the temples themselves, while actually confined to an arc, is substantially in the direction of the movement of the fabric so that to all practical intents and purposes, the temple movement is not unlike that prevailing when the supporting means is adapted to slide rectilinearly. The bearing means for the shaft on which the temple carrying arms are fixed may be suitably supported at the loomside or at other fixed parts of the mechanism adjacent thereto and comprises rubber bushings held against rotation on the end of the shaft and also within certain parts of the said brackets, these rubber bushings being under a certain amount of torsional strain thereby to bias the temples toward the direction from which the fabric is being formed. Reference is hereby made to applications Serial Nos. 191,039, filed October 19, 1950, and 194,683, filed November 8, 1950, now Patents 2,598,882 and 2,598,821, respectively, in which similar temple mountings have been disclosed and in which the details of the bearings themselves are fully illustrated and described.

In these mountings in which a single shaft on which the temple carrying arms are fixed extends more or less across the full width of the loom, it is evident that movement of one temple is necessarily accompanied by a similar movement of the other. Furthermore, it is not practical to apply to either temple a different setting as compared to the other, it being understood that at certain times and in the weaving of certain fabrics, that may be desirable. For numerous reasons it is highly desired that the mounting of the temples be in effect an independent one, although for simplicity of mechanism and since in many instances there is no possibility of bearing means at or adjacent the center of the loom, it is desired to extend the pivot shaft clear across the loom between bearings which are advantageously located and solidly fixed at or adjacent the loomsides, or in some instances, upon the cloth roll stands.

According to the invention, the simplest possible mounting is availed of, yet the temples themselves may be independently adjusted and one may be moved by hand when it is desired to displace a temple temporarily for any desired reason, without disturbing the other and without overcoming the torsional forces incidental to two preloaded bearings rather than one. A shaft divided at or adjacent its mid point is adapted to serve more or less as a unitary member and is kept in alignment by means of a particular coupling hereinafter to be described in greater detail. This coupling while it maintains the alignment as aforesaid, permits relative torsional movement of one part of the shaft with respect to the other and is readily displaced or removed whenever it becomes desirable to disassemble the parts, it being possible due to the use of a two-part shaft and a coupling to disassemble one side without disturbing the other.

The invention will be described by reference to one specific embodiment thereof as evidenced in the accompanying figures of drawing wherein.

Figure 1:
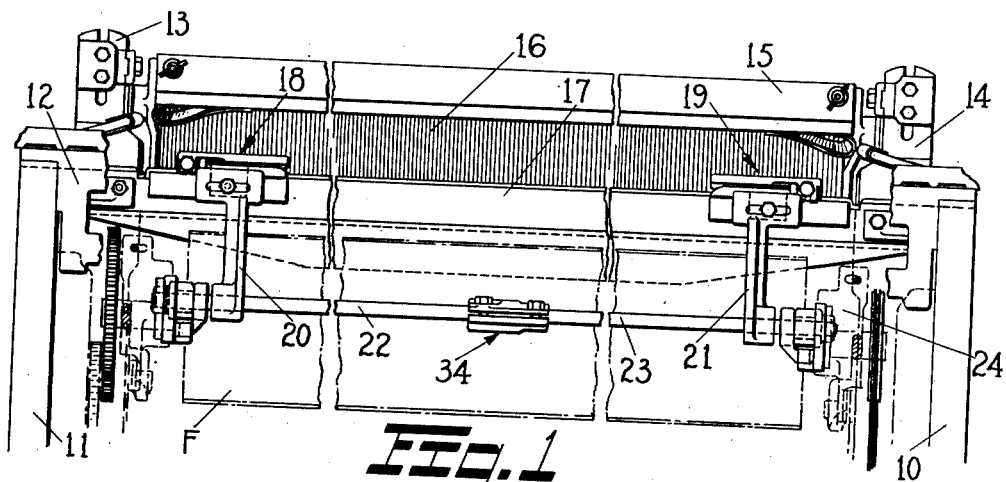
Fig. 1 is a front elevation of a typical loom, certain parts being removed, showing the invention as applied thereto.

Now referring to Fig. 1, enough of a loom has been illustrated so as to show the association of parts incidental to the temples, their mountings, etc. The loom comprises loomsides 10 and 11 and other structural parts including a breast beam 12 most of which has been broken away so as to show parts behind it. The view is taken from the front of the loom looking toward the back and one may see parts of the swords 13 and 14, hand rail 15, reed 16, and at the front of the loom as shown in the dot-and-dash lines, there would be a take-up on which a roll of fabric F might be wound. Behind this fabric roll and beneath the level of the fabric which is determined by the lay, a part of which is shown at 17, the temples, and the breast beam are to be found the various parts incidental to mounting the temples for operation in the intended fashion. At eash side of the fabric the selvage is maintained within temples generally indicated by numerals 18 and 19 each of which is laterally adjustable with respect to a mounting pad at the upper or free end of one of the arms 20 or 21 as the case may be. These arms are in turn fixed in any satisfactory manner, for example, by keying or set screwing, to a shaft which is in fact a two-part member having one part 22 and an opposite part 23, these preferably being equal in length, although it is not entirely necessary that the length of these parts be identical.

Figure 3:
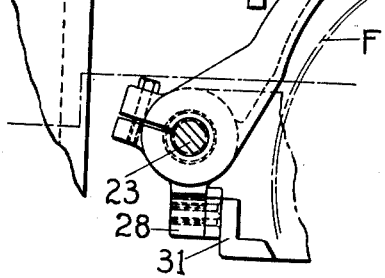
Fig. 3 is a detail view showing one of the end bearings in which the temple carrying shaft is pivoted.
Figure 3:
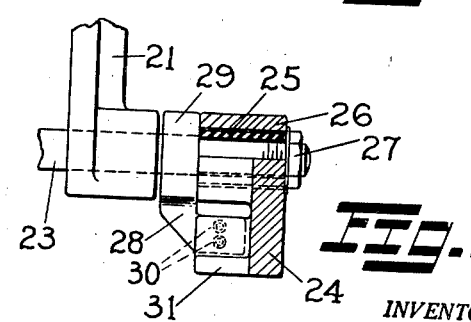

At either end of the combined shaft, there is provided a bearing means within which the shaft is borne for oscillatory movement, and also by which the arms and temples carried thereby are always urged or biased in a direction contra to the movement of the fabric as the same is produced, i. e., toward the back of the loom. These bearings preferably comprise brackets such as the bracket 24 attached to some suitable fixed portion of the framework of the loom and also, as illustrated more clearly in Fig. 3, a rubber bushing 25 which is of the type in which a rubber sleeve is held between and preferably bonded to metal sleeve members the outer of which is clamped within the hub 26 of the bracket while the inner is held against a shoulder on shaft 23 by means of a nut 27. By positioning the parts properly before clamping up on the rubber bushing, it may be so disposed that when the arms such as the arm 21 and the temple carried thereby are pulled forwardly to an operative position relatively to the fabric and to the moving lay parts, sufficient tension will be placed on the rubber as the same is put under torsion so as to bias the temples toward the rear of the loom with a sufficient amount of resilient force resistant to their forward movement which, of course, does occur as the lay moves forwardly to beat-up position. At that time a pad on the lay contacts the arms or a part of the temples and moves them forwardly.

The rearward movement of the arms 20 and 21 and temples carried thereby is limited by a stop lug 28 projecting laterally from the hub or collar 29 which is set screwed or otherwise fixed to the shaft 23 and which bears through certain adjustable stop members 30 against an abutment 31 which preferably forms some part of the bracket 24 and is in position to be contacted by the stop members 30 which, when employed for adjustment purposes, may be used to set the position of the temple very accurately.

The construction at one side only has been described here since both sides are practically the same and a description of one suffices for both. It is to be understood that any type of bearing means adapted to support the temples and of the type herein described and more thoroughly depicted and disclosed in the copending applications above identified may be employed so long as the temples are mounted upon swinging arms pivoted below the plane of the fabric substantially as described.

Preferably, the temples should be relatively independent so that one may be adjusted slightly closer to the fell than the other for purposes well known to those conversant in the weaving arts, or for other reasons it may be highly desirable that the mounting be independent. While that has been accomplished in certain instances by two entirely separate units neither of which is at all associated or interconnected with the other, for simplicity's sake it is preferably that what amounts to a single shaft or as herein specifically employed, a two-part shaft always maintained in alignment, and bearings at the ends of the shaft only, thereby leaving the center of the loom entirely free of supporting members or of bearing mechanism such as might be difficult to reach for adjustment or servicing, or in some instances, may not even be permissible since there are parts at that general location prohibiting the addition of anything for this specific purpose.

The mechanism to this point is old having been employed for a period of time and is subject matter of the patent applications above identified, except for the fact that the shaft is comprised of the two parts 22 and 23. These shaft parts are maintained in substantial alignment and are operatively associated so that the temples may be virtually independent, although from another point of view, the shaft is substantially unitary in nature in that it is borne only at the ends. The inner ends of the shaft parts approach somewhat closely and one, as herein shown, the end of the shaft part 22, has been turned down as at 32 and is threaded at the end for the reception of a nut 33. A coupling member 34 having a reduced portion 35 bored to receive the end of the shaft 23, Figs. 4, 5 and 6, has that end fixed therein by clamping and also by set screws 36. The coupling is split as illustrated in Figs. 4 and 5 and a clamping screw 37 is used to draw the ends together.

The reduced end 32 of the shaft part 22 has clamped thereon by nut 33 a sleeve 38 to which is bonded or at least to which is attached in some permanent fashion a rubber annulus 39 which is held interiorly of a second and larger sleeve 40. This sleeve 40 is also clamped within the enlarged part of the coupling by a clamping screw 41. The rubber annulus 39 thus held under pressure and preferably being bonded to the sleeves 38 and 40 may serve with the remaining parts of the coupling to align the shaft members as described, and also permit a considerable amount of angular movement between them without any appreciable torsional deflection of the elastic insert itself. In fact, it would permit many times the angular displacement of the shaft as compared to the actual displacement ever to be found necessary. This elastic bushing is not preloaded to any appreciable extent and is long enough to form an effective guide against axial displacement of the shaft parts.

Now having described the details of one preferred form of the invention, it is believed that the operation thereof is rather obvious since either of the temples 18 or 19 may be positioned independently of the other and, in fact, its operation during the weaving function is virtually independent of the other. If desired the biasing effect of the elastic bushing 25 in which the ends of the shaft parts are carried may be set differently at one side than at the other, although for most purposes that would not be advisable.

Figure 4:
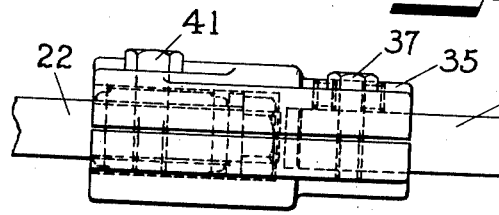
Fig. 4 is a detail view of the coupling by which the two shaft parts are aligned and maintained in operative relationship.
Figure 5:
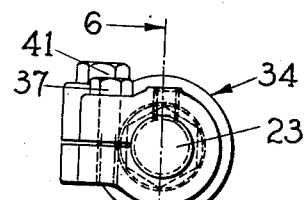
Fig. 5 is a section taken through the shaft showing the manner in which the coupling is clamped thereto.
Figure 2:
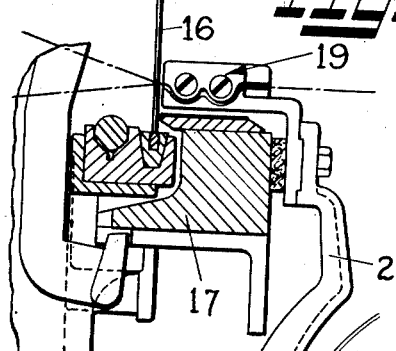
Fig. 2 is a section through a part of the loom adjacent the lay, reed, etc., illustrating the relative position and mounting of the temples.
Figure 6:
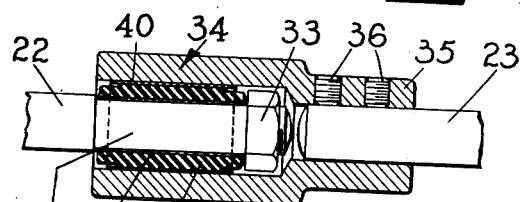
Fig. 6 is a longitudinal section through Fig. 5 on line 6—6 showing details of the elastic bushing incidental to these parts.

In some cases it may be found sufficient to dispense with the elastic bushing illustrated in detail in Figs. 4–6, although that is by all means to be preferred. A plain bushing or plain bearing may function with reasonable satisfaction and, the invention is to be understood to contemplate that modification in certain instances where the elastic bushing, or the slight additional expense thereof is not believed to be necessary.

While one embodiment and a modification of the invention have been described, it is to be understood that the inventive concept may be carried out in a number of ways. This invention is, therefore, not to be limited to the precise details described, but is intended to cover all variations and modifications thereof falling within the spirit of the invention and the scope of the appended claims.

I claim:

1. In a loom for weaving, temples and a supporting mounting therefor which comprises arms to the free end of each of which a temple is attached, a shaft extending transversely of the loom to which said arms are fixed and bearing means for said shaft which comprises a bracket fixed to said loom adjacent each end of said shaft and an elastic bushing carried in each said bracket and embracing the adjacent shaft end, said shaft being formed of two parts which are connected at a point intermediate the temple carrying arms by a coupling of a type to permit relative rotation between the said shaft parts.

2. In a loom for weaving, temples and a supporting mounting therefor which comprises arms to the free end of which a temple is attached, a shaft extending transversely of the loom to which said arms are fixed and bearing means for said shaft which comprises a bracket fixed to said loom adjacent each end of said shaft and an elastic bushing under torsional stress carried by each said bracket and embracing the adjacent end of the shaft, said shaft formed of two parts, and means for interconnecting said shaft parts for maintaining them in substantial alignment but permitting a limited amount of angular movement of one relatively to the other.

3. In a loom for weaving, temples and a supporting mounting therefor which comprises arms to the free end of each of which a temple is attached, a shaft extending transversely of the loom to which said arms are fixed and bearing means for said shaft which comprises a bracket fixed to said loom adjacent each end of said shaft and a rubber bushing under torsional stress fixed in each bracket and embracing and biasing the adjacent shaft end to urge the temple rearwardly of the loom, said shaft being formed of two parts, and means for interconnecting said shaft parts for maintaining them in substantial alignment but permitting a limited angular movement between them which comprises a coupling fixed to one shaft part and restraining the other part through an elastic bushing.

4. Mechanism as defined in claim 3 wherein said coupling comprises a split, elongated member bored to two different diameters, one of which clamps about its respective shaft part and the other of which is larger than its shaft part, and a rubber annulus clamped within said coupling end bored to the larger diameter and upon a reduced end of said shaft part.

References Cited in the file of this patent

UNITED STATES PATENTS

| 1,932,445 | Burns | Oct. 31, 1933 |
| 2,409,501 | Krotz | Oct. 15, 1946 |
| 2,598,821 | Nichols | June 3, 1952 |
| 2,598,882 | Berry et al. | June 3, 1952 |